US010817302B2

(12) United States Patent
Chen et al.

(10) Patent No.: US 10,817,302 B2
(45) Date of Patent: Oct. 27, 2020

(54) PROCESSOR SUPPORT FOR BYPASSING VECTOR SOURCE OPERANDS

(71) Applicant: Advanced Micro Devices, Inc., Sunnyvale, CA (US)

(72) Inventors: Jiasheng Chen, Orlando, FL (US); Bin He, Oviedo, FL (US); Mark M. Leather, Los Gatos, CA (US); Michael J. Mantor, Orlando, FL (US); Yunxiao Zou, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 150 days.

(21) Appl. No.: 15/644,045

(22) Filed: Jul. 7, 2017

(65) Prior Publication Data

US 2018/0357064 A1    Dec. 13, 2018

(30) Foreign Application Priority Data

Jun. 9, 2017   (CN) .......................... 2017 1 0434300

(51) Int. Cl.
*G06F 9/38*   (2018.01)
*G06F 9/30*   (2018.01)
(Continued)

(52) U.S. Cl.
CPC .......... *G06F 9/3867* (2013.01); *G06F 9/3001* (2013.01); *G06F 9/3012* (2013.01);
(Continued)

(58) Field of Classification Search
CPC .................................................. G06F 9/3887
See application file for complete search history.

(56) References Cited

U.S. PATENT DOCUMENTS 6,542,986 B1 *  4/2003  White ................. G06F 9/30152
                                                      712/217
6,550,059 B1     4/2003  Choe et al.
(Continued)

OTHER PUBLICATIONS

Teresa Monreal, Victor Vinals, Jose Gonzalez, Antonio Gonzalez, and Mateo Valero. "Late Allocation and Early Release of Physical Registers" IEEE Transactions on Computers, vol. 53, No. 10, Oct. 2004 (Year: 2004).*

(Continued)

*Primary Examiner* — Jacob Petranek
(74) *Attorney, Agent, or Firm* — Kowert Hood Munyon Rankin and Goetzel PC; Rory D. Rankin

(57) ABSTRACT

Systems, apparatuses, and methods for implementing a high bandwidth, low power vector register file for use by a parallel processor are disclosed. In one embodiment, a system includes at least a parallel processing unit with a plurality of processing pipeline. The parallel processing unit includes a vector arithmetic logic unit and a high bandwidth, low power, vector register file. The vector register file includes multi-bank high density random-access memories (RAMs) to satisfy register bandwidth requirements. The parallel processing unit also includes an instruction request queue and an instruction operand buffer to provide enough local bandwidth for VALU instructions and vector I/O instructions. Also, the parallel processing unit is configured to leverage the RAM's output flops as a last level cache to reduce duplicate operand requests between multiple instructions. The parallel processing unit includes a vector destination cache to provide additional R/W bandwidth for the vector register file.

20 Claims, 7 Drawing Sheets

(51) Int. Cl.
*G06F 12/0891* (2016.01)
*G06F 12/0855* (2016.01)
*G06F 12/0804* (2016.01)
*G06F 12/121* (2016.01)
*G06F 12/0875* (2016.01)

(52) U.S. Cl.
CPC ...... *G06F 9/30021* (2013.01); *G06F 9/30036* (2013.01); *G06F 9/30141* (2013.01); *G06F 9/3802* (2013.01); *G06F 9/383* (2013.01); *G06F 9/3826* (2013.01); *G06F 9/3832* (2013.01); *G06F 9/3857* (2013.01); *G06F 9/3887* (2013.01); *G06F 12/0804* (2013.01); *G06F 12/0855* (2013.01); *G06F 12/0891* (2013.01); *G06F 12/121* (2013.01); *G06F 12/0875* (2013.01); *G06F 2212/1008* (2013.01); *G06F 2212/1024* (2013.01); *G06F 2212/452* (2013.01)

(56) References Cited

U.S. PATENT DOCUMENTS

| | | | |
|---|---|---|---|
| 7,197,625 | B1 | 3/2007 | Van Hook et al. |
| 7,464,255 | B1 | 12/2008 | Tan et al. |
| 8,966,461 | B2 | 2/2015 | Gaster et al. |
| 9,342,334 | B2 | 5/2016 | Beckmann et al. |
| 9,600,288 | B1 * | 3/2017 | Potter ................... G06F 9/3824 |
| 2004/0117595 | A1 | 6/2004 | Norris et al. |
| 2005/0055543 | A1 | 3/2005 | Moyer |
| 2008/0022072 | A1 * | 1/2008 | Jung ..................... G06F 9/3836 712/209 |
| 2008/0133877 | A1 | 6/2008 | Chai et al. |
| 2012/0151156 | A1 | 6/2012 | Citron et al. |
| 2015/0205324 | A1 * | 7/2015 | Havlir ....................... G06F 1/10 713/600 |
| 2018/0088948 | A1 | 3/2018 | Rasale et al. |
| 2018/0089090 | A1 * | 3/2018 | Havlir ................. G06F 12/0875 |
| 2018/0121386 | A1 * | 5/2018 | Chen .................... G06F 9/3887 |

OTHER PUBLICATIONS

Fog, Agner, "3. The microarchitecture of Intel, AMD and VIA CPUs: An optimization guide for assembly programmers and compiler makers", Agner.org, Apr. 27, 2018, 236 pages, https://www.agner.org/optimize/microarchitecture.pdf. [Retrieved Aug. 6, 2018].
Fog, Agner, "4. Instruction tables: Lists of instruction latencies, throughputs and micro-operation breakdowns for Intel, AMD and VIA CPUs", Agner.org, Apr. 27, 2018, 352 pages, https://www.agner.org/optimize/instruction_tables.pdf. [Retrieved Aug. 6, 2018].
"Intel® 64 and IA-32 Architectures Software Developer's Manual", Intel.com, Sep. 2016, 2198 pages, vol. 2 (2A, 2B, 2C & 2D), https://www.intel.in/content/dam/www/public/us/en/documents/manuals/64-ia-32-architectures-software-developer-instruction-set-reference-manual-325383.pdf. [Retrieved Aug. 6, 2018].
Non-Final Office Action in U.S. Appl. No. 15/273,916, dated May 24, 2018, 19 pages.
Final Office Action in U.S. Appl. No. 15/273,916, dated Nov. 26, 2018, 8 pages.

* cited by examiner

PROCESSOR SUPPORT FOR BYPASSING VECTOR SOURCE OPERANDS

PRIORITY INFORMATION

This application claims benefit of priority to Chinese Application No. 201710434300.4, entitled "STREAM PROCESSOR WITH HIGH BANDWIDTH AND LOW POWER VECTOR REGISTER FILE", filed Jun. 9, 2017, the entirety of which is incorporated herein by reference in its entirety.

BACKGROUND

Description of the Related Art

Many different types of computing systems include vector processors or single-instruction, multiple-data (SIMD) processors. Tasks can execute in parallel on these types of processors to increase the throughput of the computing system. Some instructions of these tasks can utilize a large portion of a shared resource, which can reduce performance of the processor. Accordingly, contention for shared resources can cause parallel tasks to be executed in an inefficient manner. Additionally, traditional schemes for sharing resources between parallel tasks can lead to an increase in power consumption.

A parallel processor is typically pipelined. Ideally, every clock cycle produces useful execution of an instruction for each stage of the pipeline. In order to utilize each clock cycle, the processing pipeline needs to be supplied with data for the various instructions which are in their various stages of execution. However, the sharing of resources among pipelines can cause contention for these resources and cause portions of the pipeline to be idle and not performing useful work. This reduces the efficiency of the processing pipeline. For example, when any two instructions conflict for access to a register file random-access memory (RAM), the pipeline will stall while the conflict is resolved.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
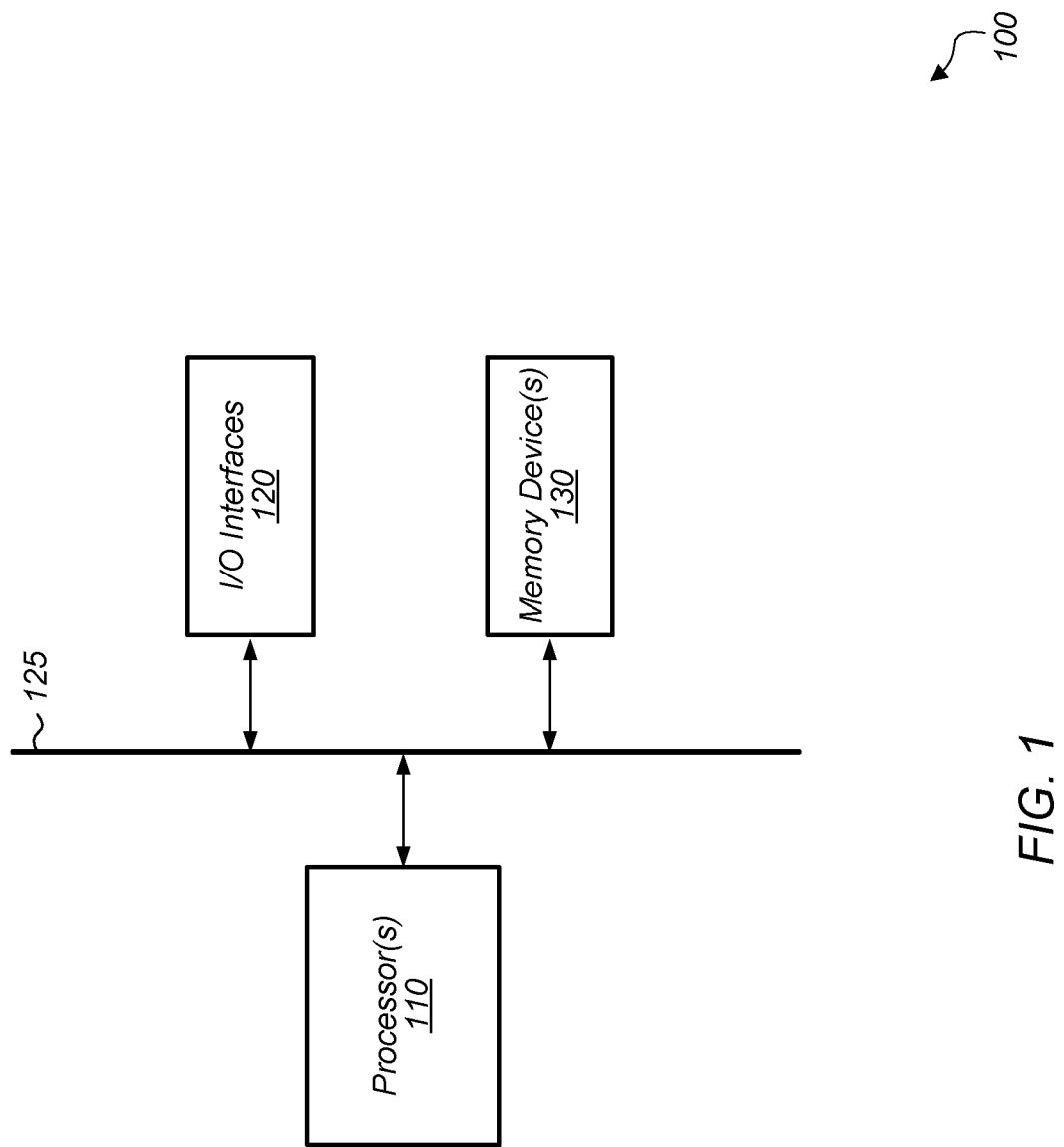
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing a high bandwidth, low power vector register file for use by a stream processor are disclosed herein. In one embodiment, a system includes at least a processing unit with a plurality of stream processors. Each stream processor includes a vector arithmetic logic unit (VALU) and a high bandwidth, low power vector register file. The vector register file includes multi-bank high density random-access memories (RAMs) to satisfy register bandwidth requirements. The stream processor also includes an instruction request queue and a source operand buffer to provide enough local bandwidth for vector arithmetic logic unit (VALU) instructions and vector input/output (I/O) instructions. Also, the stream processor is configured to leverage the RAM's output flops as a last level cache to reduce duplicate operand requests between multiple instructions. Additionally, the stream processor includes a vector destination cache to provide additional write and read bandwidth for the vector register file.

In various embodiments, the stream processor is able to reduce power consumption by avoiding the duplication of operands within the same instruction. Also, the stream processor is configured to bypass the source operand buffer by reading directly from the vector register file RAM output flops when possible. Additionally, the vector destination cache includes multiple read ports for access from the VALU allowing the VALU to bypass accessing the vector register file bank RAM. Still further, the stream processor is configured to perform an on-demand allocation of the vector destination cache to increase the storage utilization of the vector destination cache. Still further, the stream processor includes a cache recycling mechanism to avoid refetching operands and to provide an extended data dependency check window.

In one embodiment, the stream processor is configured to identify one or more source operands of a first instruction. The stream processor is configured to determine whether to forward the one or more source operands from the vector register file, source operand buffer, or vector destination cache to the VALU depending on one or more conditions. When the stream processor executes the first instruction, the stream processor waits until a last pipeline stage of the VALU until allocating a cache line in the vector destination cache. Then, the result of the first instruction is stored in the cache line allocated in the vector destination cache.

Referring now to FIG. 1, a block diagram of one embodiment of a computing system 100 is shown. In one embodiment, computing system 100 includes at least processor(s) 110, input/output (I/o) interfaces 120, bus 125, and memory device(s) 130. In other embodiments, computing system 100 can include other components and/or computing system 100 can be arranged differently.

Processors(s) 110 are representative of any number and type of processing units (e.g., central processing unit (CPU), graphics processing unit (GPU), digital signal processor (DSP), field programmable gate array (FPGA), application specific integrated circuit (ASIC)). In one embodiment, processor(s) 110 includes a vector processor with a plurality of stream processors. Each stream processor can also be referred to as a processor or a processing lane. In one embodiment, each stream processor includes a vector arithmetic logic unit (VALU) and a high bandwidth, low power vector register file. The vector register file includes multi-bank high density random-access memories (RAMs) to satisfy register bandwidth requirements. The stream processor also includes an instruction request queue and an instruction operand buffer to provide enough local bandwidth for vector arithmetic logic unit (VALU) instructions and vector input/output (I/O) instructions. Also, the stream processor is configured to leverage the RAM's output flops as a last level cache to reduce duplicate operand requests between multiple instructions. Additionally, the stream processor includes a vector destination cache to provide additional write and read bandwidth for the vector register file.

Memory device(s) 130 are representative of any number and type of memory devices. For example, the type of memory in memory device(s) 130 can include Dynamic Random Access Memory (DRAM), Static Random Access Memory (SRAM), NAND Flash memory, NOR flash memory, Ferroelectric Random Access Memory (FeRAM), or others. Memory device(s) 130 are accessible by processor(s) 110. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/o interfaces 120. Such peripheral devices include (but are not limited to) displays, keyboards, mice, printers, scanners, joysticks or other types of game controllers, media recording devices, external storage devices, network interface cards, and so forth.

Figure 2:
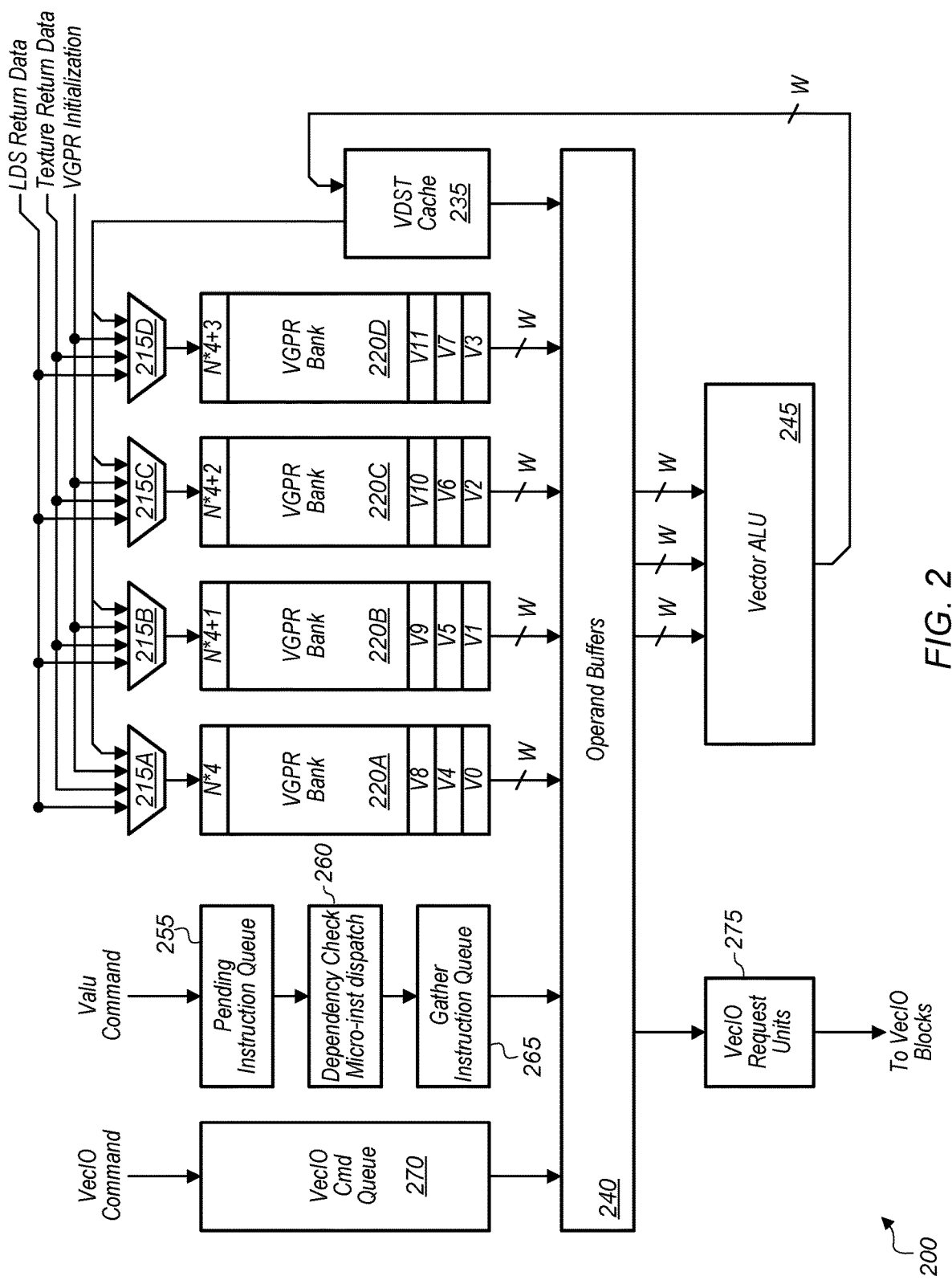
FIG. 2 is a block diagram of one embodiment of a stream processor.

Turning now to FIG. 2, a block diagram of one embodiment of a stream processor 200 is shown. Stream processor 200 includes vector arithmetic logic unit (ALU) 245. Depending on the embodiment, vector ALU 245 can include any number of ALUs. In one embodiment, vector ALU 245 includes 16 ALUs. In other embodiments, vector ALU 245 includes other numbers of ALUs.

The inputs to vector ALU 245 are provided from operand buffers 240. In one embodiment, operand buffers 240 are configured to provide multiple operands to each ALU of vector ALU 245 in a given clock cycle. The outputs of vector ALU 245 are connected to vector destination (VDST) cache 235. In one embodiment, when a given ALU in vector ALU 245 generates a result, the given ALU performs a late allocation of a cache line in VDST cache 235 for the result. In other words, the given ALU performs an on-demand allocation of the cache line for the result.

If VDST cache 235 is unable to allocate a cache line for a result from a given ALU, then the given ALU of vector ALU 245 will be stalled until the result can be stored in VDST cache 235. In one embodiment, VDST cache 235 is configured to perform cache line recycling. For example, if an un-dirty cache line is evicted so as to allocate a new cache line for a result from the given ALU, the un-dirty cache line can be recycled to operand buffers 240 if the un-dirty cache line includes one or more operands targeted by a subsequent request.

VDST cache 235 is coupled to the inputs of the multiplexers 215A-D feeding the vector general purpose register (VGPR) banks 220A-D. VDST cache 235 is also coupled to operand buffers 240. It is noted that the VGPR can also be referred to as the vector register file herein. Any number of inputs can be coupled to multiplexers 215A-D depending on the embodiment. For example, in one embodiment, local data share (LDS) return data, texture return data, VGPR initialization inputs, and inputs from VDST cache 235 are coupled to the inputs of multiplexers 215A-D. In other embodiments, other inputs can be coupled to multiplexers 215A-D. The outputs of multiplexers 215A-D are coupled to VGPR banks 220A-D. It is noted that in other embodiments, stream processor 200 can include other numbers of multiplexers 215A-D and/or other numbers of VGPR banks 220A-D.

In one embodiment, each VGPR bank 220A-D can be accessed independently from the other VGPR banks 220A-D. The VGPR banks 220A-D are coupled to operand buffers 240. Each VGPR bank 220A-D include N registers, wherein the value of N varies from embodiment to embodiment. The size of the registers in VGPR banks 220A-D can also vary according to the embodiment. In one embodiment, operand buffers 240 includes dedicated buffers which can provide three different operands to each ALU of vector ALU 245 to serve an instruction like a fused multiply add (FMA) operation which performs an a*b+c operation.

Vector ALU (VALU) commands are provided to pending instruction queue 255. Then, the commands are conveyed to dependency check micro-instruction dispatch unit 260 to check for dependencies between instructions. Then, VALU commands are conveyed to gather instruction queue 265. The VALU commands are then conveyed to individual ALUs of ALU 245 from gather instruction queue 265.

Vector input/output (I/O) commands (VecIO) are received by vector I/o command queue 270 and conveyed to vector I/O request units 275 via operand buffers 240. The operands generated for the vector I/O commands are conveyed to vector I/o request units 275, which are coupled to vector I/o blocks (not shown). Depending on the embodiment, stream processor 200 can include any number of vector I/o request units 275.

Figure 3:
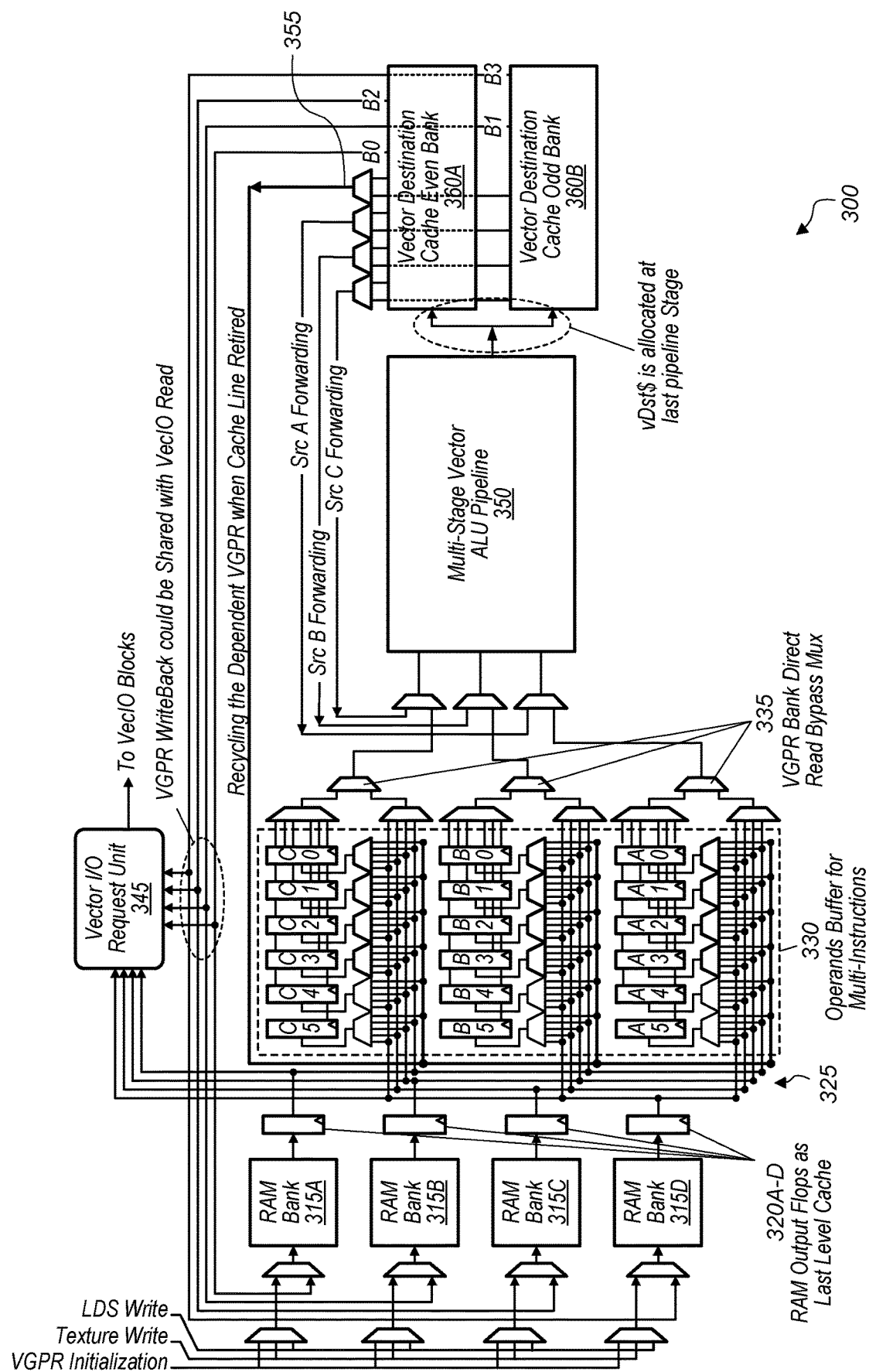
FIG. 3 is a block diagram of one embodiment of a portion of a stream processor.

Referring now to FIG. 3, a block diagram of one embodiment of a portion of a stream processor 300 is shown. The portion of stream processor 300 shown in FIG. 3 includes a single ALU pipeline. In one embodiment, stream processor 200 (of FIG. 2) includes multiple of the ALU pipelines shown in FIG. 3. The entire stream processor includes any number of pipelines, with the number of pipelines varying from embodiment to embodiment. For example, in a processor with a single instruction, multiple data (SIMD) width of 16, the stream processor would include 16 instances of the pipeline shown in FIG. 3.

The stream processor 300 includes multiple VGPR banks 315A-D. In one embodiment, the VGPR includes 4 banks. In other embodiments, the VGPR can include other numbers of banks. In one embodiment, each bank can perform 1 read and 1 write per cycle. In one embodiment, the read result is stored in the read FLOPs 320A-D once a read request is made to the VGPR bank. If an operand needed by a pending instruction is stored in a read FLOP 320, the operand can be provided to the ALU pipeline directly from read FLOP 320 by bypassing source operands buffer 330.

Source operands buffer 330 can hold multiple VALU instruction's source operands, with the number of operands varying from embodiment to embodiment. In one embodiment, source operands buffer 330 holds up to 6 VALU instruction's source operands. In one embodiment, source operand buffer 330 includes dedicated buffers for providing 3 different operands per clock cycle to serve instructions like a fused multiply-add operation which performs a*b+c.

In one embodiment, a crossbar 325 routes the VGPR bank's read result from the output flops 320A-B to the operands buffer 330. In one embodiment, each individual operand storage can receive a read from any bank 315A-D. A single bank's write can broadcast to multiple operand storage locations if the operands are requesting the same VGPR address. The crossbar 325 can also route data from a VGPR bank 315 read to a Vector I/o Request Unit 345 to provide operands for Vector I/O blocks (not shown).

In one embodiment, the source operands buffer 330 is bypassed if the VALU operands can be retrieved directly from the RAM output flops 320A-D. Retrieving VALU operands directly from the RAM output flops 320A-D helps to save the power of reading and writing to the source operands buffer 330 and also reduces the instruction issue latency. In one embodiment, the source operands buffer 330 provides 3 operands read per cycle for a multi-stage VALU pipeline 350 which also writes 1 operand per cycle as an output. Any of the three source operands of the multi-stage VALU pipeline 350 can be forwarded from the vector destination cache 360.

In one embodiment, a cache line is assigned on-demand for a VALU destination operand at the last stage of ALU pipeline 350. If the vector destination cache controller cannot find a new cache line or re-assign a non-dirty cache line to the request corresponding to the VALU destination operand, the VALU pipeline 350 can be stalled. While some VALU instructions (e.g., FMA instructions) only produce one destination operand, other VALU instructions (e.g., double-precision FMA operations) produce two destination operands. In one embodiment, when the VALU pipeline 350 is stalled, reads are not performed to the source operands buffer 330 to issue the next instruction. In one embodiment, operands requests to the VGPR banks 315A-D from the pending instructions queue and servicing vector I/o requests can still be performed.

In one embodiment, the vector destination cache 360 can have multiple banks 360A-B. For example, in one embodiment, the vector destination cache 360 can include 2 banks. In this embodiment, the even bank 360A of the vector destination cache 360 can cache VGPRs belonging to bank 315A and bank 315C of the VGPR File, and the odd bank 360B of the vector destination cache 360 can cache VGPRs belonging to the bank 315B and bank 315D of VGPR file.

Depending on the embodiment, each vector destination cache bank 360A-B can have one or multiple write ports. Each vector destination cache bank 360A-B can have multiple forwarding read ports to provide additional VGPR read bandwidth if the source operand hits in the vector destination cache 360. Each vector destination cache bank 360A-B can provide multiple write back read ports to write back dirty cache lines to the VGPR 315. In one embodiment, the write back read ports are shared with the Vector I/O read requests. The vector destination cache 360 also provides source forwarding to the start of the ALU pipeline 350 to bypass source operands buffer 330.

In one embodiment, the vector destination cache 360 provides a special, dedicated read port 355 for cache recycling, with the number of read ports depending on the number of cache lines the system can allocate. The vector destination cache 360 can store multiple entries, with the number of entries varying depending on the embodiment. In one embodiment, each bank 360A-B of the vector destination cache holds 4 entries, for a total 8 entries with 2 banks. A vector I/o write can write directly to the VGPR 315 rather than writing to the vector destination cache 360. In one embodiment, when a vector I/O write is performed directly to the VGPR 315, the write would block the vector destination cache 360 write back path for the corresponding bank. The vector destination cache 360 can retry the write back in the next cycle. If a vector I/O write matches a cache line of the vector destination cache 360, the cache line of the vector destination cache 360 will be invalidated to keep data coherence between the vector destination cache 360 and the VGPR 315.

Figure 4:
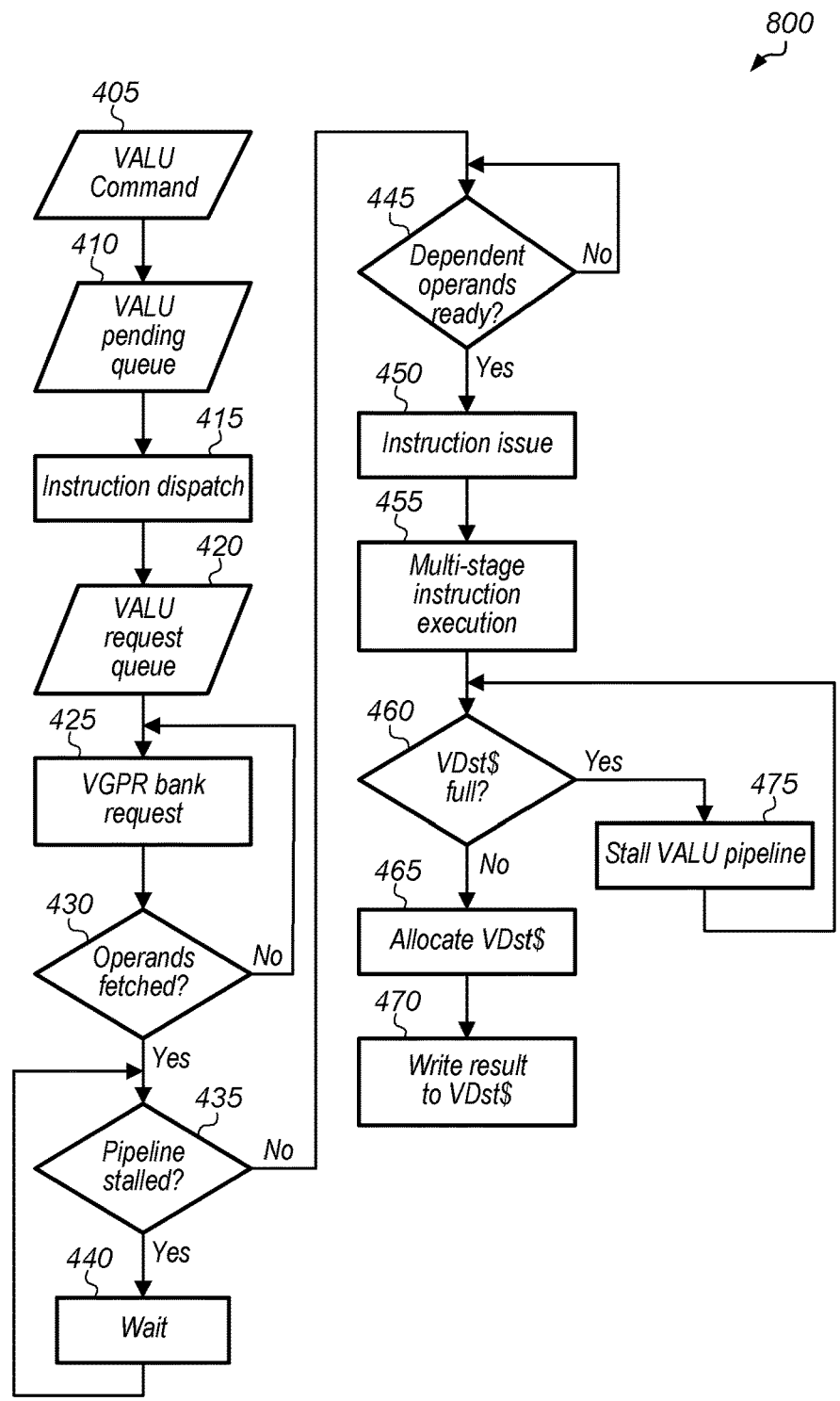
FIG. 4 is a generalized flow diagram illustrating one embodiment of a method for processing instructions in a stream processor.
Figure 5:
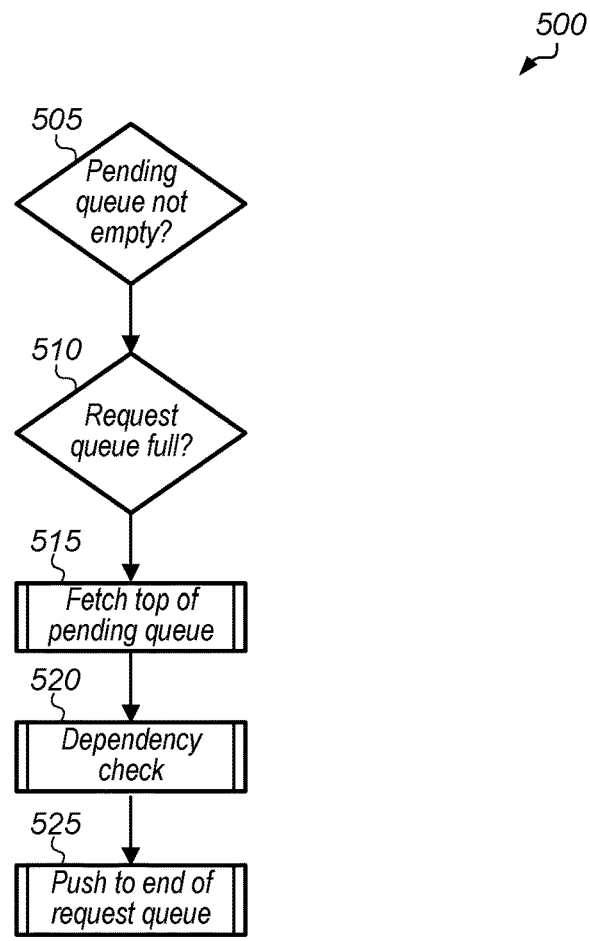
FIG. 5 is a generalized flow diagram illustrating one embodiment of a method for implementing an instruction dispatch sub-routine.
Figure 6:
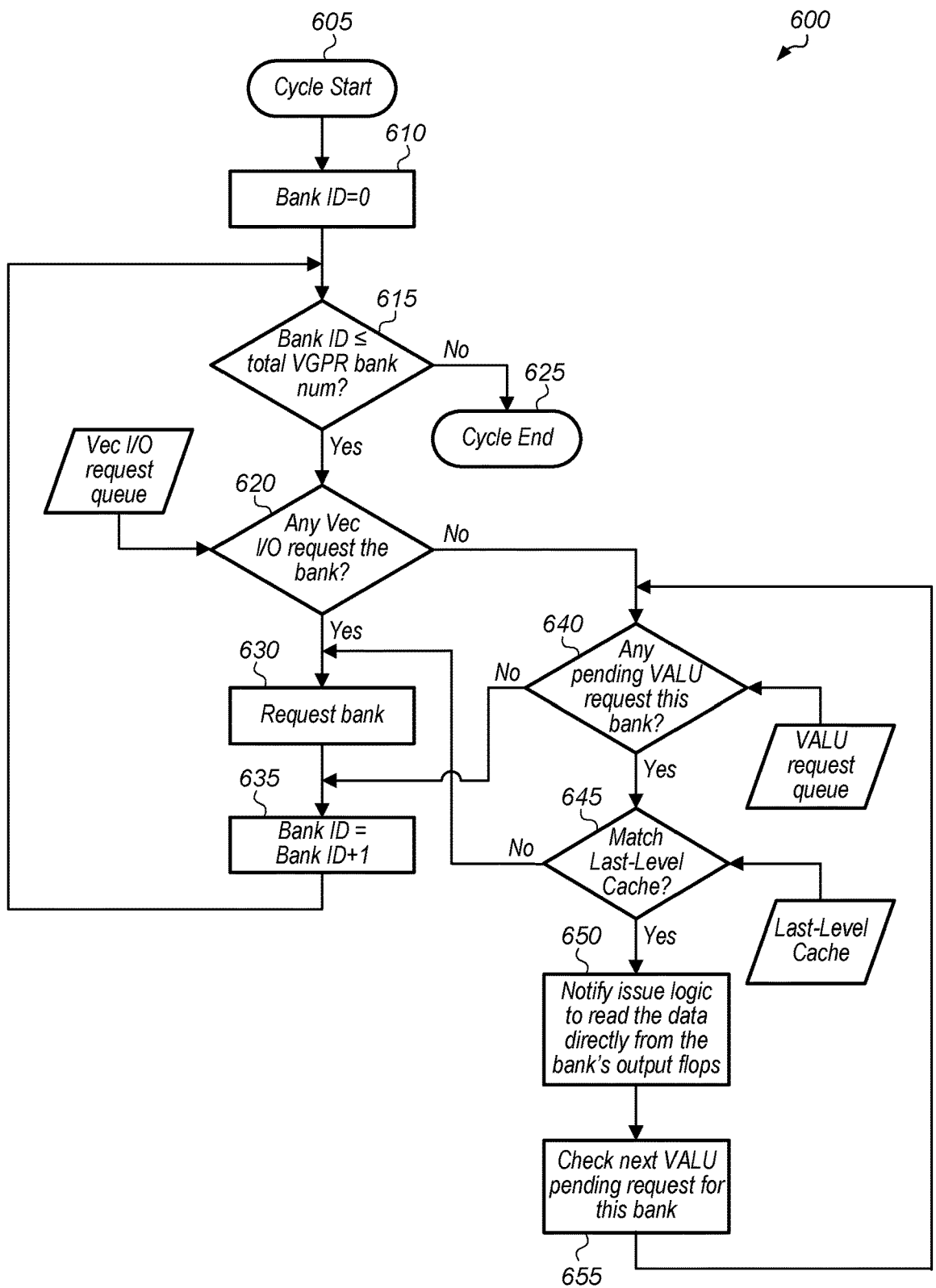
FIG. 6 is a generalized flow diagram illustrating one embodiment of a method for implementing a VGPR bank request arbiter.
Figure 7:
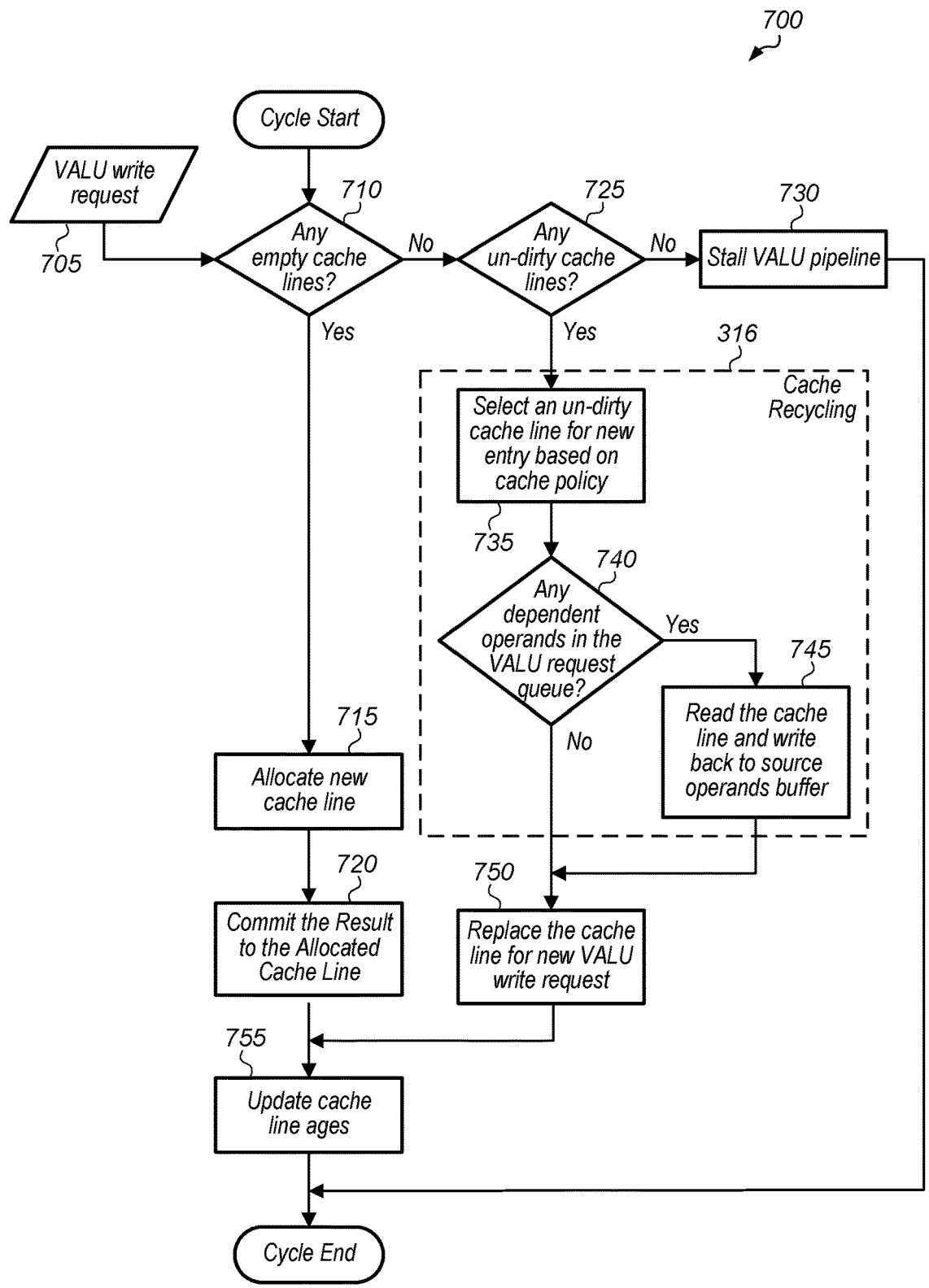
FIG. 7 is a generalized flow diagram illustrating one embodiment of a method for allocating and recycling in the vector destination cache.

Turning now to FIG. 4, one embodiment of a method 400 for processing instructions in a stream processor is shown. For purposes of discussion, the steps in this embodiment and those of FIGS. 5-7 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 400.

The stream processor receives an instruction command from an instruction sequencer (block 405) and stores the instruction command into a pending queue for VALU instructions (block 410). An instruction dispatch unit fetches a VALU instruction from the front of the pending queue (block 415) and sends the VALU instruction to the request queue when the request queue has space (block 420). A VGPR bank request arbiter checks all the pending instruction's valid source operands and makes requests to the VGPR banks to fully utilize the VGPR banks' read bandwidth (block 425).

A VALU issue unit checks the status of the instruction at the front of the next request queue, and if all the required operands have been fetched from the VGPR banks (conditional block 430, "yes" leg), and the VALU pipeline is not stalled (conditional block 435, "no" leg) and all of the dependent operands are ready (conditional block 445, "yes" leg), the issue block issues the instruction to the VALU (block 450). If the VALU pipeline is stalled (conditional block 435, "yes" leg), then the VALU issue unit waits (block 440) before returning to conditional block 435. After block 450, the instruction proceeds through a multi-stage instruction execution pipeline (block 455). A VALU instruction might need multiple cycles to be executed in the VALU pipeline. For example, a typical FMA operation might need 4 to 5 pipeline stages to finish execution.

At the end of the VALU pipeline (which in one embodiment is a rounding stage for the example pipeline of FIG. 3), the pipeline requests the vector destination cache controller to allocate a cache line for the result. If the vector destination cache is not full (conditional block 460, "no" leg), then the vector destination cache controller allocates a cache line for the result (block 465). Once the required cache lines have been allocated for the finished VALU instruction, the result is committed to the vector destination cache (block 470) and is written back to the main VGPR banks when necessary. After block 470, method 400 ends. If the vector destination cache controller cannot find a new cache line (conditional block 460, "yes" leg), the VALU pipeline is stalled (block 475) and the result is kept in flops for the next cycle to retry.

Referring now to FIG. 5, one embodiment of a method 500 for implementing an instruction dispatch sub-routine is shown. In one embodiment, method 500 is implemented as block 415 (i.e., the instruction dispatch block) of method 400 (of FIG. 4). In one embodiment, the instruction dispatch unit is responsible for moving instructions from the pending queue to the request queue (conditional block 505). If the request queue is not full (conditional block 510, "yes" leg), then the instruction from the top of the pending queue is fetched and stored in the request queue (block 515).

The instruction dispatch unit performs dependency checking for the instructions in the request queue (block 520). Any of the instruction's source operands can depend on an un-executed instruction sitting in the request queue, or the source operands can depend on an executing instruction in the VALU pipeline or on any previously executed instruction that has its result available in the vector destination cache. If a source operand has a dependency, then in some cases, it might not need to fetch any data from the VGPR, which helps to save the bandwidth of the VGPR banks and also save power.

For example, if a source operand can be fetched from the vector destination cache, then the source operand can be read directly from the vector destination cache to save the VGPR banks' bandwidth and power. Some instructions are complex instructions that might need multiple cycles or require more than 3 operands as a FMA instruction. These instructions may need multiple slots in the source operand buffer. The dispatch block would also be responsible to push the instructions to the request queue (block 525). After block 525, method 500 ends.

Turning now to FIG. 6, one embodiment of a method 600 for implementing a VGPR bank request arbiter is shown. There can be multiple instructions (vector I/O and VALU) sitting in queues which need the VGPR bank request arbiter to select which operands can be read from which VGPR banks. The arbiter checks all the pending requests (vector I/O and VALU) for each bank. For any bank of the VGPR, a vector I/O request would have higher priority. If there is no vector I/O request for the bank, the arbiter would choose the oldest VALU pending instruction's first unfetched operand and make the request for this operand unless certain conditions are met. For example, if the VALU operand depends on an unfinished previous instruction or if the VALU operand matches a cache line from the vector destination cache, then the arbiter does not need to make the request to the VGPR. If the current VALU request matches the pending request of the bank or if the current VALU request matches the data available at the output flops of the RAM, the arbiter would not send this request and instead would notify the instruction issue logic to fetch the data directly from the RAM output flops and write the data to the source operand buffer.

An example cycle for the arbiter is shown in the flowchart of FIG. 6 for method 600. The cycle starts in block 605, with the arbiter starting with a bank ID equal to 0 (block 610). If the bank ID is less than or equal to the total number of VGPR banks (conditional block 615, "yes" leg), then the arbiter determines, from the vector I/O request queue, if there are any vector I/O requests to the bank (conditional block 620). Otherwise, if the bank ID is greater than the total number of VGPR banks (conditional block 615, "no" leg), then the cycle ends (block 625).

If there is a vector I/O request to the bank (conditional block 620, "yes" leg), then the arbiter makes a request of this bank for the operand targeted by the vector I/O request (block 630). Then, the arbiter increments the bank ID (block 635) and method 600 returns to conditional block 615. If there is a not a vector I/O request to the bank (conditional block 620, "no" leg), then the arbiter determines, via the VALU request queue, if there is a pending VALU request to the bank (conditional block 640). If there is a pending VALU request to the bank (conditional block 640, "yes" leg), then the arbiter determines if the pending VALU request matches the data in the last-level cache (conditional block 645). It is noted that the flops on the outputs of the VGPR banks can be referred to as a "last-level cache". If there is not a pending VALU request to the bank (conditional block 640, "no" leg), then method 600 jumps to block 635 to increment the bank ID.

If the pending VALU request matches the data in the last-level cache (conditional block 645, "yes" leg), then the arbiter notifies the issue logic to read the data directly from the bank's output flops (block 650). Then, the arbiter checks the next VALU pending request for this bank (block 655), and then method 600 returns to conditional block 640. If the pending VALU request does not match the data in the last-level cache (conditional block 645, "no" leg), then method 600 jumps to block 630 with the arbiter making a request of this bank for the operand targeted by the VALU request. It is noted that in one embodiment, method 600 is performed by the arbiter during each clock cycle.

Referring now to FIG. 7, one embodiment of a method 700 for allocating and recycling in the vector destination cache is shown. A finished vector ALU (VALU) instruction can request one or more cache lines in the vector destination cache to commit its result. In response to receiving a VALU write request (block 705), the vector destination cache controller checks if there are any empty cache lines in the vector destination cache (conditional block 710). It is noted that the vector destination cache controller may be referred to within the discussion of FIG. 7 as the cache controller for the purposes of brevity. In one embodiment, the vector destination cache has multiple banks, and the vector destination cache bank ID is determined by the LSBs of the VALU result's VGPR address. In other embodiments, the vector destination cache bank ID can be determined in other manners. If there are empty cache lines to hold the VALU result (conditional block 710, "yes" leg), then a new cache line is allocated for the result (block 715). Then, the VALU commits the result to the allocated cache line (block 720).

If there are no empty entries to hold the VALU result (conditional block 710, "no" leg), then the cache controller determines if there are any un-dirty cache lines that can be reassigned for the new VALU result (conditional block 725). It is noted that an un-dirty cache line refers to an unmodified or clean cache line (i.e., with the dirty bit not set). If the cache does not have any un-dirty cache lines (conditional block 725, "no" leg), then the VALU result cannot be committed, and the VALU pipeline is stalled and the state is kept for the next cycle to retry (block 730). The cache controller's write back logic might free up some space that is able to be reused for the next cycle.

If the cache controller finds an un-dirty cache line to replace (conditional block 725, "yes" leg), then the cache controller selects an un-dirty cache line for the new entry, with the selection based on the cache replacement policy (block 735). Next, the cache controller determines if the un-dirty cache line includes dependent operands needed by requests in the VALU request queue (conditional block 740). If the un-dirty cache line has operands needed by requests in the VALU request queue (conditional block 740, "yes" leg), then the data from the un-dirty cache line is written back to the source operands buffer (block 745). Next, the un-dirty cache line is replaced with data from the new VALU write request (block 750). Then, the cache line age is updated (block 755). After block 755, method 700 ends. One benefit of recycling the retired cache line is avoiding having to refetch the operands from the VGPR for the pending instruction in the request queue. Also, once a VALU instruction gets pushed into the request queue after performing a dependency check, an operand that can be fetched directly from the previous instruction in the pipeline or the vector destination cache does not need to fetch data from the VGPR banks.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a memory; and
   a processor coupled to the memory, wherein the processor comprises:
      a vector register file;
      a source operand buffer;
      a vector arithmetic logic unit (VALU); and
      a vector destination cache for storing results of instructions executed by the VALU;
   wherein the processor is configured to:
      select a first cache line of the vector destination cache based on a cache replacement policy, responsive to determining:
         the VALU has result data to write to the vector destination cache; and
         no cache line in the vector destination cache is empty;
      evict the selected first cache line from the vector destination cache; and
      write the first cache line to the source operand buffer responsive to determining:
         that the first cache line is a clean cache line; and
         that the first cache line comprises one or more source operands targeted by a pending instruction.

2. The system as recited in claim 1, wherein the processor is further configured to:
   identify one or more source operands of a first instruction;
   determine whether to forward the one or more source operands from one of the vector register file, the source operand buffer, and the vector destination cache to the VALU;
   wait until a last pipeline stage of the VALU until allocating a cache line in the vector destination cache; and
   store a result of the first instruction in the cache line allocated in the vector destination cache.

3. The system as recited in claim 2, wherein the processor is configured to:
   forward the one or more source operands from the source operand buffer responsive to determining the one or more source operands are stored in the source operand buffer;
   prefetch the one or more source operands from the vector register file and store the one or more source operands in the source operand buffer responsive to determining the one or more source operands are stored in the vector register file; and
   convey the one or more source operands from the source operand buffer to the VALU responsive to issuing the first instruction to the VALU.

4. The system as recited in claim 1, wherein the processor further comprises a plurality of flip-flops on outputs of the vector register file.

5. The system as recited in claim 4, wherein the vector register file comprises multiple banks, and wherein the processor is further configured to:
   determine if a first operand matches a previous result on a given bank of the vector register file; and
   bypass the source operand buffer to retrieve the first operand from flip-flops on the output of the given bank responsive to determining that the first operand matches the previous result on the given bank of the vector register file.

6. The system as recited in claim 1, wherein the processor is further configured to:
   stall the VALU if the processor is unable to allocate a cache line in the vector destination cache; and
   wait to allocate a cache line in the vector destination cache until a result is generated by the VALU.

7. The system as recited in claim 1, wherein the processor is configured to write the first cache line to the vector register file responsive to determining that the first cache line is a dirty cache line.

8. A method comprising:
   selecting a first cache line of a vector destination cache based on a cache replacement policy, responsive to determining:
      a vector arithmetic logic unit (VALU) has result data to write to the vector destination cache; and
      no cache line in the vector destination cache is empty;
   evicting the selected first cache line from the vector destination cache; and
   writing the first cache line to the source operand buffer responsive to determining:
      that the first cache line is a clean cache line; and
      that the first cache line comprises one or more source operands targeted by a pending instruction.

9. The method as recited in claim 8, further comprising:
   identifying one or more source operands of a first instruction;
   determining whether to forward the one or more source operands from one of the vector register file, the source operand buffer, and the vector destination cache to the VALU depending on one or more conditions;
   waiting until a last pipeline stage of the VALU until allocating a cache line in the vector destination cache; and
   storing a result of the first instruction in the cache line allocated in the vector destination cache.

10. The method as recited in claim 9, wherein:
   forwarding the one or more source operands from the source operand buffer responsive to determining the one or more source operands are stored in the source operand buffer;
   prefetching the one or more source operands from the vector register file and store the one or more source operands in the source operand buffer responsive to determining the one or more source operands are stored in the vector register file; and conveying the one or more source operands from the source operand buffer to the VALU responsive to issuing the first instruction to the VALU.

11. The method as recited in claim 8, wherein a plurality of flip-flops are located on outputs of the vector register file.

12. The method as recited in claim 11, further comprising:
determining if a first operand matches a previous result on a given bank of the vector register file; and
bypassing the source operand buffer to retrieve the first operand from flip-flops on the output of the given bank responsive to determining that the first operand matches the previous result on the given bank of the vector register file.

13. The method as recited in claim 8, further comprising:
stalling the VALU responsive to being unable to allocate a cache line in the vector destination cache; and
waiting to allocate a cache line in the vector destination cache until a result is generated by the VALU.

14. The method as recited in claim 8, further comprising writing the first cache line to the vector register file responsive to determining that the first cache line is a dirty cache line.

15. An apparatus comprising:
a vector register file;
a source operand buffer;
a vector arithmetic logic unit (VALU); and
a vector destination cache for storing results of instructions executed by the VALU;
wherein the apparatus is configured to:
select a first cache line of the vector destination cache based on a cache replacement policy, responsive to determining:
the VALU has result data to write to the vector destination cache; and
no cache line in the vector destination cache is empty;
evict the selected first cache line from the vector destination cache; and
write the first cache line to the source operand buffer responsive to determining:
that the first cache line is a clean cache line; and
that the first cache line comprises one or more source operands targeted by a pending instruction.

16. The apparatus as recited in claim 15, wherein the apparatus is further configured to:
identify one or more source operands of a first instruction;
determine whether to forward the one or more source operands from one of the vector register file, the source operand buffer, and the vector destination cache to the VALU depending on one or more conditions;
wait until a last pipeline stage of the VALU until allocating a cache line in the vector destination cache; and
store a result of the first instruction in the cache line allocated in the vector destination cache.

17. The apparatus as recited in claim 16, wherein the apparatus is further configured to:
forward the one or more source operands from the source operand buffer responsive to determining the one or more source operands are stored in the source operand buffer;
prefetch the one or more source operands from the vector register file and store the one or more source operands in the source operand buffer responsive to determining the one or more source operands are stored in the vector register file; and
convey the one or more source operands from the source operand buffer to the VALU responsive to issuing the first instruction to the VALU.

18. The apparatus as recited in claim 15, wherein the apparatus further comprises a plurality of flip-flops on outputs of the vector register file.

19. The apparatus as recited in claim 18, wherein the vector register file comprises multiple banks, and wherein the apparatus is further configured to:
determine if a first operand matches a previous result on a given bank of the vector register file; and
bypass the source operand buffer to retrieve the first operand from flip-flops on the output of the given bank responsive to determining that the first operand matches the previous result on the given bank of the vector register file.

20. The apparatus as recited in claim 15, wherein the apparatus is further configured to stall the VALU if the apparatus is unable to allocate a cache line in the vector destination cache.

* * * * *